(12) United States Patent
Bontu et al.

(10) Patent No.: US 10,856,233 B2
(45) Date of Patent: Dec. 1, 2020

(54) COVERAGE EXTENSION FOR WIRELESS DEVICES

(71) Applicant: Telefonaktiebolaget LM Ericsson (publ), Stockholm (SE)

(72) Inventors: Chandra Sekhar Bontu, Nepean (CA); Peter Hazy, Ottawa (CA); Michael McKenna, Richmond (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 22 days.

(21) Appl. No.: 16/092,047

(22) PCT Filed: Jun. 27, 2016

(86) PCT No.: PCT/IB2016/053833
§ 371 (c)(1),
(2) Date: Oct. 8, 2018

(87) PCT Pub. No.: WO2017/187241
PCT Pub. Date: Nov. 2, 2017

(65) Prior Publication Data
US 2019/0116558 A1 Apr. 18, 2019

Related U.S. Application Data

(60) Provisional application No. 62/329,675, filed on Apr. 29, 2016.

(51) Int. Cl.
*H04W 56/00* (2009.01)
*H04W 52/14* (2009.01)
(Continued)

(52) U.S. Cl.
CPC ........ *H04W 52/143* (2013.01); *H04B 17/336* (2015.01); *H04L 1/0003* (2013.01);
(Continued)

(58) Field of Classification Search
CPC ........... H04W 52/143; H04W 52/0261; H04W 52/241; H04W 52/262; H04B 17/336; H04L 1/0003
(Continued)

(56) References Cited

U.S. PATENT DOCUMENTS 8,345,693 B1 * 1/2013 Kim .................. H04B 7/15592
370/400
8,948,109 B2 2/2015 Lee et al.
(Continued)

FOREIGN PATENT DOCUMENTS

EP 2 314 110 A1 4/2011
GB 2510366 A 8/2014

OTHER PUBLICATIONS

International Search Report and Written Opinion of the International Searching Authority dated Dec. 21, 2016 issued in corresponding PCT Application No. PCT/IB2016/053833, consisting of 11 pages.
(Continued)

*Primary Examiner* — Sai Ming Chan
(74) *Attorney, Agent, or Firm* — Sage Patent Group

(57) ABSTRACT

A method and network entity for extending communication coverage in a network between a network entity and a wireless device. The method includes determining that the wireless device qualifies for coverage extension, the determining including that deriving appropriate transmission parameters for the wireless devices results in one of a lowest possible or most robust modulation and coding scheme (MCS), and determining achievable transmission performance parameters for the wireless device. If the determined achievable transmission performance parameters do not meet a set of pre-established transmission criteria, the downlink transmission power to the wireless device is increased.

32 Claims, 5 Drawing Sheets

(51) Int. Cl.
H04W 52/24 (2009.01)
H04W 52/26 (2009.01)
H04B 17/336 (2015.01)
H04L 1/00 (2006.01)
H04W 52/02 (2009.01)

(52) U.S. Cl.
CPC ..... *H04W 52/0261* (2013.01); *H04W 52/241* (2013.01); *H04W 52/262* (2013.01)

(58) Field of Classification Search
USPC .......................................................... 370/311
See application file for complete search history.

(56) References Cited

U.S. PATENT DOCUMENTS

| | | | | |
|---|---|---|---|---|
| 9,807,709 | B2* | 10/2017 | Deng | H04W 52/242 |
| 2005/0130692 | A1* | 6/2005 | Furukawa | H04W 52/24 |
| | | | | 455/522 |
| 2007/0133449 | A1* | 6/2007 | Schacht | H04W 4/06 |
| | | | | 370/312 |
| 2009/0286562 | A1* | 11/2009 | Gorokhov | H04L 25/0228 |
| | | | | 455/501 |
| 2011/0310877 | A1* | 12/2011 | Wu | H04L 1/1893 |
| | | | | 370/343 |
| 2012/0263095 | A1* | 10/2012 | Quan | H04W 74/0833 |
| | | | | 370/312 |
| 2013/0115998 | A1* | 5/2013 | Lamm | H04W 52/58 |
| | | | | 455/522 |
| 2015/0043420 | A1* | 2/2015 | Xiong | H04W 56/00 |
| | | | | 370/315 |

OTHER PUBLICATIONS

3GPP TS 36.213 V12.4.0 (Dec. 2014) 3rd Generation Partnership Project; Technical Specification Group Radio Access Network; Evolved Universal Terrestrial Radio Access (E-UTRA); Physical Layer Procedures (Release 12) Jan. 7, 2015 consisting of 225 pages.
3GPP TSG-RAN WG1 Meeting #79 R1-144993, Title: Data Channel Enhancement for MTC, Agenda item: 6.3.1.2.1, Source: Nokia Networks, Nokia Corporation, Document for: Discussion and Decision, Conference Location and Date: San Francisco, USA, Nov. 17-21, 2014 consisting of 6 pages.

* cited by examiner

COVERAGE EXTENSION FOR WIRELESS DEVICES

CROSS-REFERENCE TO RELATED APPLICATIONS

This application is a Submission Under 35 U.S.C. § 371 for U.S. National Stage Patent Application of International Application Number: PCT/IB2016/053833, filed Jun. 27, 2016 entitled "COVERAGE EXTENSION FOR WIRELESS DEVICES," which claims priority to U.S. Provisional Application No. 62/329,675, filed Apr. 29, 2016, entitled "COVERAGE EXTENSION FOR WIRELESS DEVICES," the entireties of both of which are incorporated herein by reference.

TECHNICAL FIELD

The present disclosure relates to wireless communications, and in particular, a method and network entity for extending communication coverage for wireless devices.

BACKGROUND

In a typical cellular network, the network resources such as transmit power and radio resources are used efficiently to maximize the utilization of the available radio spectrum.

Typically, low complexity wireless devices, such as devices with fewer number of transmit/receive antennas, devices having low transmit power capabilities, or devices equipped with subpar receiver performance can be assisted by the network to improve the overall system performance Examples of low complexity devices could be, for example, a smartwatch, a device with only one receive antenna, or any device having low battery power. Devices that may be benefit from wireless connectivity such as Internet of Things (IoT) devices may also fall into the low complexity category.

In another example, the network, even if in communication with wireless devices of sufficient complexity, may desire to extend its default communication coverage capabilities to account for any wireless device, i.e., not necessarily "low complexity" devices, that is moving away from the network entity, i.e., a base station or enhanced node B (eNB). For ease of understanding, the devices that may benefit from the extended network coverage are discussed within the context of "low complexity" devices.

Currently, the transmission parameters of the network are not adjusted to improve the performance of low complexity wireless devices or to increase the coverage area. Cellular operators can have wireless devices manufactured from various vendors. When the low complexity wireless devices are not treated appropriately, or if there is an inability to extend the coverage area, for example, to account for wireless devices moving away from the base station, the result may be an adverse effect on the overall system performance. For example, if a base station or eNB tries to schedule data packets to wireless devices at the cell edge and/or low complexity wireless devices data packets may not be successfully received by the intended wireless device or may be received by the wireless device with very low success rate. This results in a waste of resources and drop in overall cell throughput due to increased number of data packet retransmissions. Further, the coverage may not uniformly be the same for wireless devices with varying capabilities, thus creating coverage holes for low complexity devices, resulting frequent connection reestablishments and handovers (which may results in unsuccessful attempts).

SUMMARY

Some embodiments advantageously provide a method and network entity for extending communication coverage in a network between the network entity and a wireless device. According to one aspect, a method includes determining that the wireless device qualifies for coverage extension, determining including that deriving appropriate transmission parameters for the wireless devices results in one of a lowest possible or most robust modulation and coding scheme (MCS),), and determining achievable transmission performance parameters for the wireless device. If the determined achievable transmission performance parameters do not meet a set of pre-established transmission criteria, the downlink transmission power to the wireless device is increased.

According to this aspect, in some embodiments, the method also includes reevaluating the transmission parameters based on the increasing of the downlink transmission power to the wireless device. In some embodiments, the method further includes determining a target signal-to-interference-plus-noise ratio (SINR) associated with the set of pre-established transmission criteria and increasing the downlink transmission power to the wireless device to assure meeting the determined SINR.

In some embodiments, the transmission criteria include at least one of a target block error rate (BLER), target throughput, and target packet delay. In some embodiments, determining that the wireless device qualifies for coverage extension includes determining that the wireless device has fewer than a predetermined number of receiver antennas. In some embodiments, determining that the wireless device qualifies for coverage extension includes determining that the wireless device has a battery power lower than a predetermined amount. In some embodiments, determining that the wireless device qualifies for coverage extension includes determining that the wireless device is moving away from the network entity. In some embodiments, determining that the wireless device qualifies for coverage extension includes receiving an indication of the wireless device's capabilities when the wireless device enters the network. In some embodiments, the network entity receives the indication of the wireless device's capabilities during radio resource control, RRC, connection set up. In some embodiments, the method further includes determining additional resources needed to meet an increase in a total power budget due to increasing the downlink transmission power to the wireless device, and determining if the additional resources exceed a predetermined amount of headroom, wherein if the additional resources exceed the predetermined amount of headroom, creating additional headroom to increase the downlink transmission power to the wireless device.

In some embodiments, the predetermined amount of headroom is equal to available resources for the wireless device. In some embodiments, the method further includes creating additional headroom by readjusting an initial resource assignment for the wireless device such that the additional resource assignment required to meet the increase in the total power budget are within the additional headroom. In some embodiments, the additional resources required to meet the increase in the total power budget are set to zero-transmit-power resources. In some embodiments, available resources for scheduling a next wireless device in a scheduling queue are determined by the available resources for the wireless device minus the initial resource assignment minus the additional resources required to meet the increase in the total power budget. In some embodiments, available resources for scheduling the next wireless device in a scheduling queue are determined by the available resources for the wireless device minus the initial resource assignment. In some embodiments, the wireless device is assigned resources in a transmission time interval (TTI). a maximum number of assigned resources being limited by a number of available radio resources from assignable radio resources, the assignable radio resources can be greater than or equal to the number of available radio resources.

In some embodiments, the method further includes determining a transport block size (TBS) based on available radio resources, and wherein determining that the wireless device qualifies for coverage extension is based at least upon the determined TBS. In some embodiments, the method further include determining a SINR for a current allocation of resources, computing a ratio of the SINR for the current allocation of resources to the SINR associated with the set of pre-established transmission criteria, and computing additional resources based at least upon the ratio of the SINR for the current allocation of resources to the SINR associated with the set of pre-established transmission criteria.

According to another aspect, a network entity for extending communication coverage in a network between the network entity and a wireless device is provided. The network entity includes a communication interface, processing circuitry including a memory and a processor, the memory in communication with the processor, the memory having instructions that, when executed by the processor, configure the processor to determine that the wireless device qualifies for coverage extension, the determining including that deriving appropriate transmission parameters for the wireless devices results in one of a lowest possible or most robust modulation and coding scheme (MCS), and to determine achievable transmission performance parameters for the wireless device. If the determined achievable transmission performance parameters do not meet a set of pre-established transmission criteria, the processor is configured to increase the downlink transmission power to the wireless device.

According to this aspect, in some embodiments the memory further stores instructions that, when executed, configure the processor to reevaluate the transmission parameters based on the increasing of the downlink transmission power to the wireless device. In some embodiments, the memory further stores instructions that, when executed, configure the processor to determine a target signal-to-interference-plus-noise ratio (SINR) associated with the set of pre-established transmission criteria and increasing the downlink transmission power to the wireless device to assure meeting the determined SINR. In some embodiments, the transmission criteria include at least one of a target block error rate (BLER), target throughput, and target packet delay. In some embodiments, determining that the wireless device qualifies for coverage extension includes determining that the wireless device has fewer than a predetermined number of receiver antennas. In some embodiments, determining that the wireless device qualifies for coverage extension includes determining that the wireless device has a battery power lower than a predetermined amount. In some embodiments, determining that the wireless device qualifies for coverage extension includes determining that the wireless device is moving away from the network entity. In some embodiments, determining that the wireless device qualifies for coverage extension includes receiving, at the communication interface, an indication of the wireless device's capabilities when the wireless device enters the network. In some embodiments, the communication interface receives the indication of the wireless device's capabilities during radio resource control (RRC) connection set up. In some embodiments, the memory further stores instructions that, when executed, configure the processor to determine additional resources needed to meet an increase in a total power budget due to increasing the downlink transmission power to the wireless device, and determine if the additional resources exceed a predetermined amount of headroom. If the additional resources exceed the predetermined amount of headroom, additional headroom is created to increase the downlink transmission power to the wireless device.

In some embodiments, the predetermined amount of headroom is equal to available resources for the wireless device. In some embodiments, the memory further stores instructions that, when executed, configure the processor to create additional headroom by readjusting an initial resource assignment for the wireless device such that the additional resource assignment required to meet the increase in the total power budget are within the additional headroom. In some embodiments, the additional resources required to meet the increase in the total power budget are set to zero-transmit-power resources. In some embodiments, available resources for scheduling a next wireless device in a scheduling queue are determined by the available resources for the wireless device minus the initial resource assignment minus the additional resources required to meet the increase in the total power budget. In some embodiments, available resources for scheduling the next wireless device in a scheduling queue are determined by the available resources for the wireless device minus the initial resource assignment. In some embodiments, the wireless device is assigned resources in a transmission time interval, TTI, a maximum number of assigned resources being limited by a number of available radio resources from assignable radio resources, the assignable radio resources can be greater than or equal to the number of available radio resources.

In some embodiments, the memory further stores instructions that, when executed, configure the processor to determine a transport block size (TBS) based on available radio resources, and wherein determining that the wireless device qualifies for coverage extension is based at least upon the determined TBS.

In some embodiments, the memory further stores instructions that, when executed, configure the processor to determine a SINR for a current allocation of resources, compute a ratio of the SINR for the current allocation of resources to the SINR associated with the set of pre-established transmission criteria, and compute additional resources based at least upon the ratio of the SINR for the current allocation of resources to the SINR associated with the set of pre-established transmission criteria.

According to another aspect, a network entity for extending communication coverage in a network between the network entity and a wireless device is provided. The network entity includes processing circuitry including a memory and a processor, the memory in communication with the processor. The memory has instructions that, when executed by the processor, configure the processor to determine that the wireless device qualifies for coverage extension, the determining including that deriving appropriate transmission parameters for the wireless devices results in one of a lowest possible or most robust modulation and coding scheme (MCS), and determine achievable transmission performance parameters for the wireless device. If the determined achievable transmission performance parameters do not meet a set of pre-established transmission criteria, a communication interface is configured to receive instructions to increase the downlink transmission power to the wireless device.

In some embodiments, the memory further stores instructions that, when executed, configure the processor to reevaluate the transmission parameters based on the increasing of the downlink transmission power to the wireless device.

In some embodiments, the memory further stores instructions that, when executed, configure the processor to determine a target SINR associated with the set of pre-established transmission criteria and increase the downlink transmission power to the wireless device to assure meeting the determined SINR.

In some embodiments, the transmission criteria include at least one of a target BLER, target throughput, and target packet delay.

In some embodiments, determining that the wireless device qualifies for coverage extension includes determining that the wireless device has fewer than a predetermined number of receiver antennas.

In some embodiments, determining that the wireless device qualifies for coverage extension includes determining that the wireless device has a battery power lower than a predetermined amount.

In some embodiments, determining that the wireless device qualifies for coverage extension includes determining that the wireless device is moving away from the network entity.

In some embodiments, determining that the wireless device qualifies for coverage extension includes receiving, at the communication interface, an indication of the wireless device's capabilities when the wireless device enters the network.

In some embodiments, the communication interface receives the indication of the wireless device's capabilities during RRC connection set up.

In some embodiments, the memory further stores instructions that, when executed, configure the processor to determine additional resources needed to meet an increase in the total power budget due to increasing the downlink transmission power to the wireless device, and determine if the additional resources exceed a predetermined amount of headroom, wherein if the additional resources exceed the predetermined amount of headroom, the processor is further configured to create additional headroom to increase the downlink transmission power to the wireless device.

In some embodiments, the predetermined amount of headroom is equal to available resources for the wireless device. In some embodiments, the memory further stores instructions that, when executed, configure the processor to create additional headroom by readjusting an initial resource assignment for the wireless device such that the additional resource assignment required to meet the increase in the total power budget are within the additional headroom. In some embodiments, the additional resources required to meet the increase in the total power budget are set to zero-transmit-power resources. In some embodiments, available resources for scheduling a next wireless device in a scheduling queue are determined by the available resources for the wireless device minus the initial resource assignment minus the additional resources required to meet the increase in the total power budget.

In some embodiments, available resources for scheduling the next wireless device in a scheduling queue are determined by the available resources for the wireless device minus the initial resource assignment. In some embodiments, the wireless device is assigned resources in a transmission time interval, TTI, a maximum number of assigned resources being limited by a number of available radio resources from assignable radio resources, the assignable radio resources can be greater than or equal to the number of available radio resources.

In some embodiments, the memory further stores instructions that, when executed, configure the processor to determine a TBS based on available radio resources, and wherein determining that the wireless device qualifies for coverage extension is based at least upon the determined TBS.

In some embodiments, the memory further stores instructions that, when executed, configure the processor to determine a SINR for a current allocation of resources, compute a ratio of the SINR for the current allocation of resources to the SINR associated with the set of pre-established transmission criteria, and compute additional resources based at least upon the ratio of the SINR for the current allocation of resources to the SINR associated with the set of pre-established transmission criteria.

According to another aspect a network entity for extending communication coverage in a network between the network entity and a wireless device is provided. The network entity includes a communication interface module, and a processor module configured to determine that the wireless device qualifies for coverage extension, the determining including that deriving appropriate transmission parameters for the wireless devices results in one of a lowest possible or most robust modulation and coding scheme (MCS), and determine achievable transmission performance parameters for the wireless device. If the determined achievable transmission performance parameters do not meet a set of pre-established transmission criteria, a coverage extension module is configured to increase the downlink transmission power to the wireless device.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
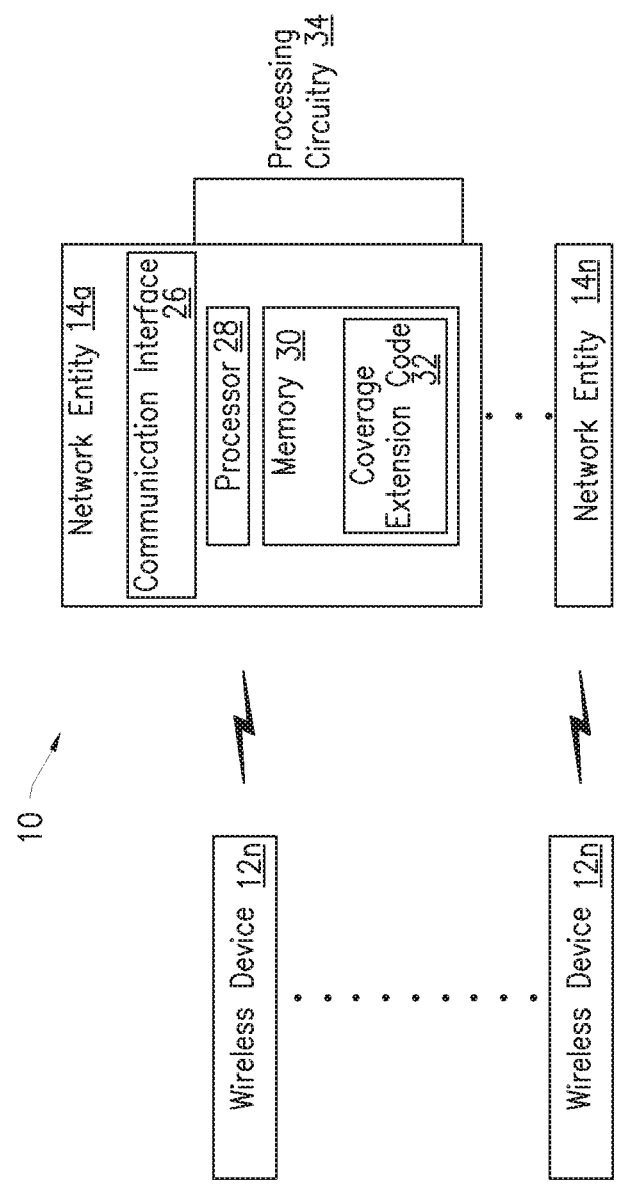
FIG. 1 illustrates a network diagram showing communication between one or more wireless devices with one or more network entities incorporating the principles of the present disclosure.

The disclosure advantageously provides a method and network entity for extending network coverage for certain wireless devices by increasing downlink transmission power from the network entity to the wireless devices if certain performance criteria are not met.

Before describing in detail exemplary embodiments, it is noted that the embodiments reside primarily in combinations of apparatus components and processing steps related to extending communication coverage for certain qualifying wireless devices in a network. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Referring now to drawing figures in which like reference designators refer to like elements there is shown in FIG. 1 an exemplary network for increasing network coverage for wireless devices such as, for example, those wireless devices considered to be of low complexity. Network 10 includes one or more wireless devices 12a-12n (hereinafter collectively referred to as wireless device 12) and one or network entities 14a-14n (hereinafter collectively referred to as network entity 14) in communication with each other via one or more networks using one or more communication protocols. Wireless devices 12 may be low complexity wireless devices.

Network entity 14 includes communication interface 26 for transmission and reception of signaling, communication signals and/or data to/from wireless device 12, other network entities 14 and/or other entities in network 10 via one or more networks using one or more communication protocols such as $3^{rd}$ Generation Partnership Project (3GPP) long term evolution (LTE) based communication protocols. In one or more embodiments, communication interface 26 may include one or more transmitters and receivers that provide communication interface to wireless device 12, other network entities 12 and/or other entities in network 10.

Network entity 14 includes one or more processors 28 for performing network entity 14 functions described herein. Network entity 14 includes memory 30 that is configured to store code such as coverage extension code 32. For example, coverage extension code 32 includes instructions which, when executed by processor 28, causes processor 28 to perform the coverage extension process discussed in detail with respect to FIGS. 2-4.

Figure 2:
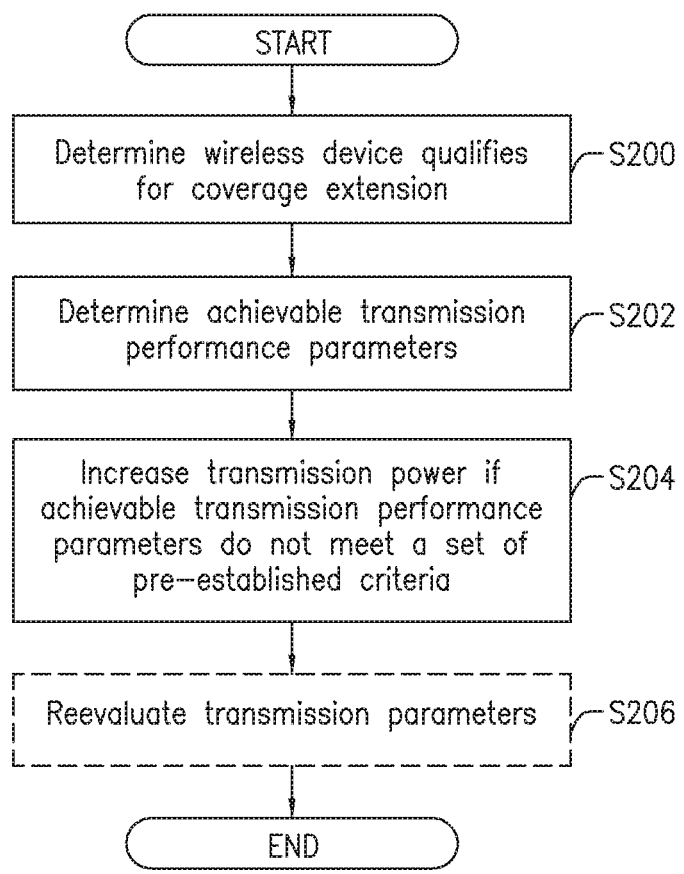
FIG. 2 illustrates a flow diagram incorporating the principles of the present disclosure.
Figure 3:
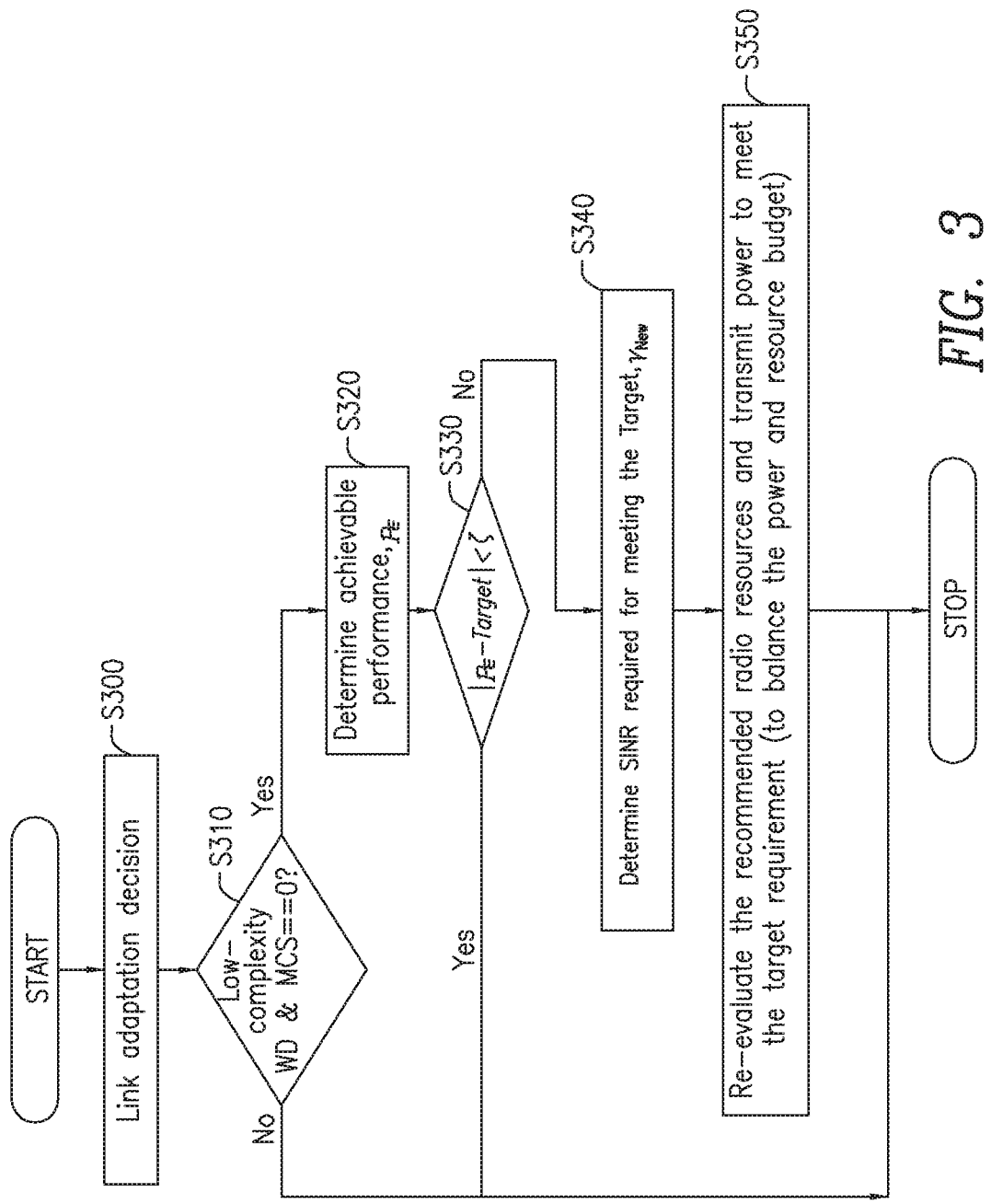
FIG. 3 illustrates a flow diagram for transmitting power boosting for a low complexity wireless device incorporating an embodiment of the present disclosure.
Figure 4:
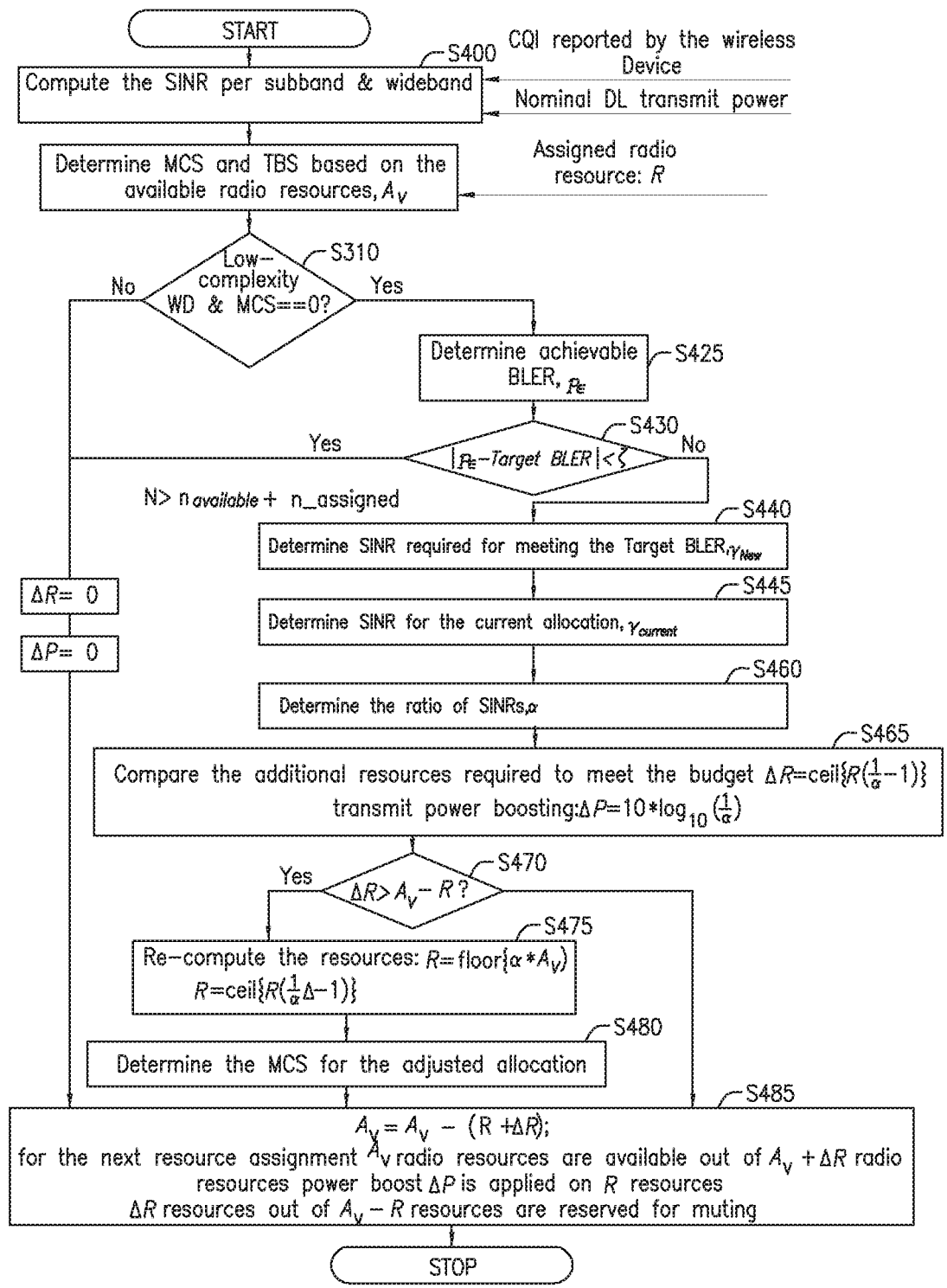
FIG. 4 illustrates a flow diagram of an alternate embodiment for transmitting power boosting for a low complexity wireless device incorporating another embodiment of the present disclosure.

In one or more embodiments, processor 28 and memory 30 form processing circuitry 34 containing instructions which, when executed configure processor 28 to perform the one or more functions described with respect to FIGS. 2-4. In addition to a traditional processor and memory, processing circuitry 34 may include integrated circuitry for processing and/or control, e.g., one or more processors and/or processor cores and/or FPGAs (Field Programmable Gate Array) and/or ASICs (Application Specific Integrated Circuitry). Processing circuitry 34 may comprise and/or be connected to and/or be configured to access (e.g., write to and/or read from) memory 30, which may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 30 may be configured to store code executable by control circuitry and/or other data, e.g., data pertaining to communication, e.g., configuration and/or address data of network entities, nodes, etc. Processing circuitry 34 may be configured to control any of the methods described herein and/or to cause such methods to be performed, e.g., by network entity 14. Corresponding instructions may be stored in the memory 30, which may be readable and/or readably connected to the processing circuitry 34. In other words, processing circuitry 34 may include a controller, which may include a microprocessor and/or microcontroller and/or FPGA (Field-Programmable Gate Array) device and/or ASIC (Application Specific Integrated Circuit) device. It may be considered that processing circuitry 34 includes or may be connected or connectable to memory 30, which may be configured to be accessible for reading and/or writing by the controller and/or processing circuitry 34.

In some embodiments, a non-limiting term "wireless device" is used. The wireless device 12 herein can be any type of wireless device capable of communicating with network entity 14 or another wireless device 12 such as user equipment (UE) over radio signals. The wireless device 12 may also be radio communication device, target device, device to device (D2D) wireless device, machine type wireless device or wireless device capable of machine to machine communication (M2M), a sensor equipped with wireless device, iPAD, Tablet, mobile terminals, smart phone, laptop embedded equipped (LEE), laptop mounted equipment (LME), USB dongles, Customer Premises Equipment (CPE), etc.

Also in some embodiments, generic terminology "network entity," is used. A network entity can be any kind of network entity which may include a radio network node such as base station, radio base station, base transceiver station, base station controller, network controller, evolved Node B (eNB), Node B, Multi-cell/multicast Coordination Entity (MCE), relay node, access point, radio access point, Remote Radio Unit (RRU) Remote Radio Head (RRH), a core network node (e.g., MME, SON node, a coordinating node, etc.), or even an external node (e.g., 3rd party node, a node external to the current network), etc. The term "radio node" as used herein may be used to denote a wireless device or a radio network node.

According to embodiments described herein, for a low complexity wireless device 12, or for any other wireless devices such as, for example, a wireless device 12 that is moving away from network entity 14, the average transmit power of radio resources allocated to a downlink (DL) transmission in a wireless communication subframe can be increased such that the transmission quality meets a set of pre-established transmission criteria, when the link adaptation algorithm recommends the lowest (or the most robust) modulation and coding scheme (MCS). As used herein, the term "pre-established transmission criteria" is defined as at least one of predetermined transmission criteria and predefined transmission criteria. However, when it is determined that the transmit power of these resources is to be increased, in one embodiment, the payload size and the transmission power are reevaluated to balance the total power and resource budget in that subframe. The methods and arrangements describes herein may therefore be applied to any "qualifying" wireless device, i.e., those that are considered to be of low complexity or those that are moving away from the network entity, or any other wireless device where a transmission boost is desired in order to increase network coverage.

Examples of low complexity wireless devices 12 could be, for example, those wireless devices that have a low number of transmit or receive antennas, i.e., lower than a predetermined number of antennas, or a wireless device 12 that has low battery power, i.e., lower battery power than a predetermined battery power threshold. Examples of such wireless devices 12 could be internet of things (IoT) devices, smart watches, and the like. Even though the embodiments of the disclosure are described with respect to a communication link between a network entity 14 and a wireless device 12, the present disclosure is also applicable to a communication link between two wireless devices 12, where the radio resources for transmission link may be allocated by one of the devices or another node, which can be a network entity. Similarly, the disclosure is also applicable to communication link between two network entities 14, where the radio resources for transmission link may be allocated by one of the network entities 14 or a third network entity, which supervises efficient usage of the spectrum within a geographical area.

FIG. 2 is a flow diagram illustrating an embodiment of the present disclosure. In this embodiment, a method for extending communication coverage in the network 10 between a network entity 14 and a wireless device 12 is provided. The method includes determining, by processor 28 in network entity 14, that the wireless device 12 qualifies for coverage extension (Block S200), the determining including that deriving appropriate transmission parameters for the wireless devices results in one of a lowest possible or most robust modulation and coding scheme (MCS). Using a nominal transmit power, achievable transmission performance parameters for wireless device 12 are determined (Block S202). The transmission parameters include, for example, MCS, a first resource allocation, among other parameters. It is then determined, by processor 28, if the achievable transmission performance parameters meet a set of pre-established transmission criteria. If the determined achievable performance parameters do not meet a set of pre-established transmission criteria, the coverage of the wireless device 12 in network 10 is increased by increasing the downlink transmission power to the wireless device 12 (Block S204). This could be performed by, for example, processor 28, coverage extension code 32, or a combination of both. In one embodiment, the method further includes reevaluating, by processor 28, the transmission parameters based on the increasing of the downlink transmission power to the wireless device 12 (Block S206). The reevaluation may be performed optionally when the total transmit power for the allocated system radio resources exceed the power budget.

In another embodiment, the method further includes determining by processor 28, a SINR associated with the set of pre-established transmission criteria and, by processor 28 or coverage extension code 32, or a combination of both, increasing the downlink transmission power to the wireless device 12 to assure meeting the determined signal-to-interference-plus-noise ratio (SINR).

In another embodiment, the transmission criteria include at least one of a target block error rate (BLER), target throughput, and target packet delay.

In another embodiment, determining that the wireless device 12 qualifies for coverage extension includes determining, by processor 28, that the wireless device 12 has fewer than a predetermined number of receiver antennas.

In another embodiment, determining that the wireless device 12 qualifies for coverage extension includes determining, by processor 28, that the wireless device 12 has a battery power lower than a predetermined amount.

In another embodiment, determining that the wireless device 12 qualifies for coverage extension includes determining, by processor 28, that the wireless device is moving away from the network entity 14.

In another embodiment, determining that the wireless device 12 qualifies for coverage extension includes receiving, by communication interface 26, an indication of the wireless device's capabilities when the wireless device 12 enters the network 10.

In another embodiment, the network entity 14 receives the indication of the wireless device's capabilities during radio resource control (RRC) connection set up.

In another embodiment, the method further includes determining additional resources needed to meet an increase in the total power budget due to increasing the downlink transmission power to the wireless device 12, and determining if the additional resources exceed a predetermined amount of headroom. The additional resources determined to accommodate the increase in transmit power on the assigned resources are tagged as used resources with zero transmit power. These additional resources are further tagged as "floating" used resources with zero transmit power. In other words, these additional resources can be anywhere in the available bandwidth. If the additional resources exceed the predetermined amount of headroom, the method further includes creating additional headroom to increase the downlink transmission power to the wireless device 12. These processes could be performed, for example, by processor 28.

In another embodiment, the predetermined amount of headroom is equal to available resources for the wireless device 12. In another embodiment, the method further includes creating additional headroom by readjusting an initial resource assignment for the wireless device 12 such that the additional resource assignment required to meet the increased power budget are within the additional headroom. This process can be performed by, for example, processor 28. In another embodiment, the additional resources required to meet the increased power budget are set to zero-transmit-power resources.

In another embodiment, available resources for scheduling a next wireless device 12 in a scheduling queue are determined by the available resources for the wireless device 12 minus the initial resource assignment minus the additional resources required to meet the increased power budget. This process can be performed by, for example, processor 28. In another embodiment, available resources for scheduling the next wireless device 12 in a scheduling queue are determined by the available resources for the wireless device 12 minus the initial resource assignment. This process can be performed by, for example, processor 28. In another embodiment, the wireless device 12 is assigned resources in a transmission time interval, TTI, a maximum number of assigned resources being limited by a number of available radio resources from assignable radio resources, the assignable radio resources can be greater than or equal to the number of available radio resources. This process can be performed by, for example, processor 28.

In another embodiment, the method further includes determining, by processor 28, a transport block size (TBS) based on available radio resources, and wherein determining that the wireless device qualifies for coverage extension is based at least upon the determined TBS. In another embodiment, the method further includes determining a SINR for a current allocation of resources, computing a ratio of the SINR for the current allocation of resources to the SINR associated with the set of pre-established transmission criteria, and computing additional resources based at least upon the ratio of the SINR for the current allocation of resources to the SINR associated with the set of pre-established transmission criteria. These functions could be performed by, for example, processor 28.

The use of the term "headroom" herein refers to the available radio resources for scheduling for wireless device 12. In one embodiment, the additional headroom increase is achieved by reassessing or readjusting the initial radio resource allocation to the wireless device 12 so that the additional resources required to meet the increased transmit power are within the newly derived headroom limit. For example, by reducing the allocation size such that the additional resources required to satisfy the increase in the transmit power are within the headroom limit.

Available resources for scheduling the next wireless device 12 in the scheduling queue are determined by the available resources minus the assigned resources minus the additional resources assigned to meet the increase in the transmit power for the low complexity wireless device 12. The assignable resources for scheduling the next wireless device 12 in the scheduling queue are determined by the available resources minus the assigned resources for the low complexity wireless device 12. A wireless device 12 is assigned resources in a transmission time interval (TTI). The maximum number of resources is limited by the available number of radio resources from assignable radio resources, where the assignable radio resources can be greater than or equal to the number of available resources.

For example, a scheduler has a total of N resources available for scheduling the first wireless device 12 in scheduling queue. Further, based on the required number of bits to be transmitted to the wireless device 12, and the channel quality, it is determined by the scheduler that $N_1 (N_1 \leq N)$ resources are assigned for the scheduler for DL transmission. If the wireless device 12 is determined to be a low complexity device and further determined that the downlink (DL) transmission to this wireless device 12 needs transmit power boosting, an additional $N_2$ resources are needed to meet the total power budget. The total power budget is, for example, set as P milliwatts, i.e. P/N milliwatts per resource with fixed transmit power per resource. In this example, the transmit power budget for the wireless device 12 is determined as $N_1*P/N$ milliwatts with the nominal transmit power per resource. If the wireless device 12 needed an increase in transmit power by a factor of 1.5, then $N_2$ is determined as $N_2=\text{ceil}(1.5*N_1)$. The power budget for the additional $N_2$ resources is used to boost the transmit power of the $N_1$ resources. The transmit power of the $N_2$ resources is set to zero power. For the next wireless device 12 in the scheduling queue, the available resources are determined as $N-N_1-N_2$ out of an assignable resources of $N-N_1$. Therefore, the $N_2$ resources are "floating" during the following scheduling iterations. In a frequency selective scheduling, the above described procedure gives an additional advantage. In a frequency selective scheduling, out of the available resources, those resources which give better channel quality to the wireless device 12 are picked for downlink transmission. Since the additional resources required to meet the increased power budget are floating across the available resources, appropriate resources can be picked for the next wireless device 12 in the queue.

FIG. 3 is a flowchart illustrating another embodiment of the present disclosure. The processes illustrated in FIG. 3 and described below could be performed by processor 28 or by coverage extension code 32 or some combination of both. According to the embodiment illustrated in FIG. 3, the outcome of link adaptation (LA) at a network is reevaluated in situations where a connected wireless device 12 is one that qualifies as either a low complexity wireless device or one that is moving away from the network entity 14 such that the average transmit power of radio resources allocated to the downlink transmission to the wireless device 12 needs to be increased. The additional resources are tagged as "floating" zero-power resources to balance the total transmit power budget. For example, network entity 14 may be made aware that wireless device 12 is a low complexity wireless device 12 when the wireless device 12 indicates its capability when entering the network. For example, wireless device 12 may indicate its low-complexity status during the RRC connection set-up. While the example of a "qualifying" wireless device 12 described above includes one that is of a low complexity or one that is moving away from network entity 14, the present disclosure is not limited to these two scenarios and other criteria may be used to determine whether the wireless device 12 qualifies for such network coverage extension. A qualified wireless device 12 can also be identified by the network, for example, by monitoring the performance of wireless device 12 for some time period and comparing the average performance of wireless device 12 with a performance target. The performance target may represent a wireless device 12 which is equipped with a predefined number antennas and/or a reference receiver/transmitter. The target reference can also learned adaptively by averaging the performance of "non-low complexity" wireless device 12 operating in the network.

Referring to FIG. 3, according to one embodiment, a link adaptation decision, e.g., MCS and transport block size (TBS) determination, is made by network entity (Block S300)

It is next determined if the wireless device 12 qualifies as one that may require a boosting of transmission power based on MCS and device type (Block S310). The network entity 14 can determine whether the determined transmission parameters satisfy required criteria. The criteria, for example, can be any or a combination of target BLER, target throughput, target packet delay or other transmission parameters. As discussed above, this may mean that wireless device (WD) 12 has low battery power or a limited number of transmit or receive antennas, thus qualifying the wireless device 12 as a device of low complexity. Thus, if wireless device 12 is of low complexity or satisfies other qualifying criteria, and the outcome of the LA decision at block S310 is to transmit the data packet using the lowest possible MCS (the lowest MCS being the most robust in terms BLER), further evaluation is required to determine if this MCS will result in achievable performance.

Thus, at Block S320, the achievable performance parameters $p_\epsilon$ for the wireless device 12 are determined. As discussed above, the performance parameters could be any kind of different performance criteria including BLER, target throughput, or target packet delay, or the like. The achievable performance parameters $p_\epsilon$ are then compared to a predefined set of target performance criteria (Block S330). In other words, $|p_\epsilon - \text{Target}| < \zeta$, where $\zeta$ is a predetermined performance value. If it is determined that the achievable performance parameters $p_\epsilon$ do not meet the target performance criteria, then the transmission power allocated to the downlink (DL) transmission, i.e., transmission from the network entity 14 to the wireless device 12, can be increased. In one embodiment, it is then determined what SINR is required in order to meet the target performance criteria, γnew (Block S340). In one embodiment, network entity 14 performs a re-evaluation of the recommended radio resources and transmits power necessary to meet the target performance criteria requirements, in order to, for example, balance the power and the resource budget (Block S350).

FIG. 4 illustrates another flow diagram of another embodiment of the present disclosure. The process of FIG. 4 is a more detailed example of the process of FIG. 3. The processes illustrated in FIG. 4 and described below could be performed by processor 28 or by coverage extension code 32 or some combination of both. When a wireless device 12 qualifies as a wireless device that may require an increase in transmission power, network entity 14 computes the SINR per subband and wideband for that wireless device 12 (Block S400). Blocks S400 and S410 correspond to block S300 in FIG. 3. This computation could be based on information in the channel quality indication (CQI) report received in an uplink transmission from wireless device 12. The MCS and, in some embodiments, the transport block size (TBS) are then determined based on the available radio resources (Block S410). If it is determined that wireless device (WD) 12 is of low complexity (or otherwise qualifies for transmission boosting based on other criteria) and the link adaptation algorithm recommends the lowest MCS (Block S310), i.e., MCS=0, the achievable performance parameters $p_\epsilon$ for wireless device 12 are determined (Block S425). Although FIG. 4 uses BLER as the example performance parameter throughout, the use of BLER is exemplary only and it is within the scope of this disclosure to choose any combination of performance parameters and not only BLER. Thus, one or more other performance criteria may be used instead of or in addition to BLER throughout FIG. 4 and the discussion of FIG. 4 herein.

If the outcome of the link adaptation is to transmit the data packet using the lowest possible MCS, further evaluation is required to determine if this MCS satisfies certain performance criteria (Block S430). For example, a BLER check computes the information carrying capacity for the modulation of MCS-0. i.e., quadrature phase shift keying (QPSK) and compares the carrying capacity with the recommended transport block size (TBS). In one embodiment, during the comparison, a cyclic redundancy check (CRC) may also be added to the TBS.

If it is found that the information carrying capacity (ICC) is lower than the combined value of the TBS and the CRC, then it will be determined that the MCS-0 may result in poor performance and does not meet the required performance criteria for transmission. Network entity 14 can then determine that the transmit power needs to be boosted (thus improving the SINR) to meet the required performance criteria.

Similar to Block S340 of FIG. 3, the SINR required to meet the target BLER (other performance criteria) is determined (Block S440). It should be noted that if the wireless device's performance parameters $p_\epsilon$ are within the target criteria then power to the wireless device then there is no change in resources (i.e., $\Delta R=0$) (Block S445) or power allocation (i.e., $\Delta P=0$) (Block S450).

Block S440 through Block S485 represent, in one embodiment, steps performed in order to re-evaluate the recommended radio resources and transmit power to meet the target performance criteria as shown in Block S350 of FIG. 3. The SINR for the current allocation is determined (Block S455) and the ratio of SINRs, i.e., the ratio of the current SINR to the new SINR is determined (Block S460). Essentially, this ratio determines how much SINR improvement is required. The amount of additional power allocation $\Delta P$ and the amount of additional resources $\Delta R$ required to meet the power budget are then computed (Block S465). In one embodiment, $$\Delta R = \text{ceil}\left\{R\left(\frac{1}{\alpha} - 1\right)\right\} \text{ and}$$

$$\Delta P = 10 * \log_{10}\left(\frac{1}{\alpha}\right),$$

where $\alpha$ is the ratio of SINRs is computed in Block S460.

Network entity 14 then determines if the headroom is exceeded, thus preventing the transmission boost to wireless device 12 (Block S470). $\Delta R$ represents the additional resources to be "muted" to meet the power budget, when R resources are power-boosted by $\Delta P$. If these additional resources ($\Delta R$) exceed the available resources after this allocation, i.e., $\Delta R > A_v - R$, then there is not enough headroom to provide the transmission boost. Thus, in the instance where headroom is exceeded, the resources are recomputed, i.e., $R = \text{floor}\{\alpha * A_v\}$ (Block S475) and the MCS is determined for the adjusted allocation (Block S480). Block S480 relates to changing the allocation for the wireless device 12 which requires power-boosting but does not have enough headroom to boost. For example, if the network identifies a wireless device for transmit power boosting of 3 dB (i.e. $\alpha=0.5$), with an allocation size of R=10 PRBs, but the available PRBs for scheduling are only 15, i.e. $A_v=15$, then the available PRBs after this allocation without power boosting is $A_v - R = 5$. For this scenario, to meet the power budget, an additional PRB allocation is needed, i.e., $\Delta R = 10$, which exceeds $A_v - R$. Thus, the resource assignment is reevaluated as $R = \text{floor}(\alpha * A_v) = 8$ and $\Delta R = 7$. For this allocation, MCS and TBS are determined through Link Adaptation (LA).

Block S485 is similar to Block S350 of FIG. 3 in that the recommended radio resources and transmit power are re-evaluated to meet the target criteria. Thus, for the next resource assignment, $A_v$ radio resources are available out $A_v + \Delta R$ radio resources and power boost, $\Delta P$ is applied on R resources and $\Delta R$ resources out of $A_v - R$ resources are reserved for muting.

Low complexity wireless devices 12 or wireless devices 12 that qualify as those that are in need of power boosting, can detect the data packets whose transmit power boosted without prior knowledge of the amount of power boosting, since the modulation for MCS-0 is QPSK. If the lowest MCS supported is quadrature amplitude modulation (QAM), wireless device 12 needs to be informed along with the resource allocation regarding the power boost value for successful detection of the data packets.

Figure 5:
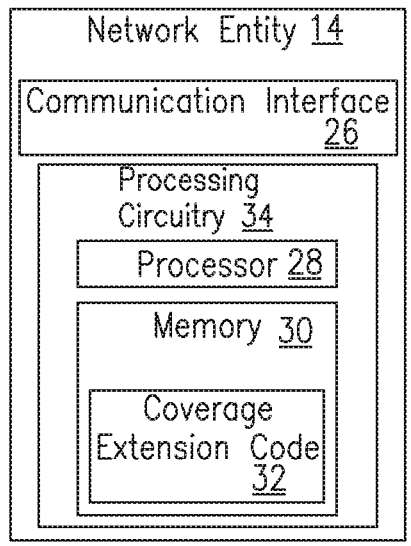
FIG. 5 illustrates a block diagram of a network entity incorporating the principles of the present disclosure.

FIG. 5 illustrates a network entity 14 in accordance with the principles of the present disclosure. In one embodiment, a network entity 14 for extending communication coverage in a network between the network entity 14 and a wireless device 12 is provided. The network entity 14 includes a communication interface 26 and processing circuitry 34 including a memory 30 and a processor 28, the memory 30 in communication with the processor 28. The memory 30 has instructions that, when executed by the processor 28, configure processor 28 to determine that wireless device 12 qualifies for coverage extension, the determining including that deriving appropriate transmission parameters for the wireless devices results in one of a lowest possible or most robust modulation and coding scheme (MCS), and determine transmission achievable transmission performance parameters for wireless device 12. If the determined achievable transmission performance parameters do not meet a set of pre-established transmission criteria, processor 28 is further configured to increase the downlink transmission power to wireless device 12. The coverage extension decision can be performed, for example, by coverage extension code 32 stored in memory 30.

In another embodiment, memory 30 further stores instructions that, when executed, configure processor 28 to reevaluate the transmission parameters based on the increasing of the downlink transmission power to the wireless device 12.

In another embodiment, memory 30 further stores instructions that, when executed, configure processor 28 to determine a SINR associated with the set of pre-established transmission criteria and increase the downlink transmission power to the wireless device to assure meeting the determined SINR.

In another embodiment, the transmission criteria include at least one of BLER, target throughput, and target packet delay.

In another embodiment, determining that the wireless device 12 qualifies for coverage extension includes determining that the wireless device 12 has fewer than a predetermined number of receiver antennas.

In another embodiment, determining that the wireless device 12 qualifies for coverage extension includes determining that the wireless device 12 has a battery power lower than a predetermined amount.

In another embodiment, determining that the wireless device 12 qualifies for coverage extension includes determining that the wireless device 12 is moving away from the network entity 14.

In another embodiment, determining that the wireless device 12 qualifies for coverage extension includes receiving, at the communication interface 26, an indication of the wireless device's capabilities when the wireless device 12 enters the network 10.

In another embodiment, the communication interface 26 receives the indication of the wireless device's capabilities during radio resource control (RRC) connection set up.

In another embodiment, the memory 30 further stores instructions that, when executed, configure the processor 28 to determine additional resources needed to meet an increased power budget due to increasing the downlink transmission power to the wireless device 12, and determine if the additional resources exceed a predetermined amount of headroom, wherein if the additional resources exceed the predetermined amount of headroom, create additional headroom to increase the downlink transmission power to the wireless device 12.

In another embodiment, the predetermined amount of headroom is equal to available resources for the wireless device 12. In another embodiment, memory 30 further stores instructions that, when executed, configure the processor 28 to create additional headroom by readjusting an initial resource assignment for the wireless device 12 such that the additional resource assignment required to meet the increased power budget are within the additional headroom.

In another embodiment, the additional resources required to meet the increased power budget are set to zero-transmit-power resources. In another embodiment, available resources for scheduling a next wireless device 12 in a scheduling queue are determined by the available resources for the wireless device 12 minus the initial resource assignment minus the additional resources required to meet the increased power budget. In another embodiment, available resources for scheduling the next wireless device 12 in a scheduling queue are determined by the available resources for the wireless device 12 minus the initial resource assignment.

In another embodiment, the wireless device 12 is assigned resources in a transmission time interval (TTI) a maximum number of assigned resources being limited by a number of available radio resources from assignable radio resources, the assignable radio resources can be greater than or equal to the number of available radio resources.

In another embodiment, memory further stores instructions that, when executed, configure the processor to determine a transport block size (TBS) based on available radio resources, and wherein determining that the wireless device 12 qualifies for coverage extension is based at least upon the determined TBS. In another embodiment, memory 30 further stores instructions that, when executed, configure the processor 28 to determine a SINR for a current allocation of resources, compute a ratio of the SINR for the current allocation of resources to the SINR associated with the set of pre-established transmission criteria, and compute additional resources based at least upon the ratio of the SINR for the current allocation of resources to the SINR associated with the set of pre-established transmission criteria.

In another embodiment, a network entity 14 for extending communication coverage in a network 10 between the network entity 14 and a wireless device 12 is provided. The network entity 14 includes processing circuitry 34 including a memory 30 and a processor 28, where the memory 30 in communication with the processor 28. The memory 30 has instructions that, when executed by the processor 28, configure the processor 28 to determine that the wireless device 12 qualifies for coverage extension, determine transmission parameters for the wireless device 12, the transmission parameters including MCS. If the determined MCS does not meet a set of pre-established transmission criteria, communication interface 26 is configured to receive instructions to increase the downlink transmission power to the wireless device 12. This embodiment covers the scenario where an entity other than network entity 14, for example, a mobility management entity (MME), makes the decision whether to extend network coverage by increasing transmission power to the wireless device 12.

In another embodiment, the network entity memory 30 further stores instructions that, when executed, configure the processor 28 to reevaluate the transmission parameters based on the increasing of the downlink transmission power to the wireless device 12.

In another embodiment, memory 30 further stores instructions that, when executed, configure the processor 28 to determine a target SINR associated with the set of pre-established transmission criteria and increase the downlink transmission power to the wireless device 12 to assure meeting the determined SINR.

In another embodiment, the transmission criteria include at least one of a target BLER target throughput, and target packet delay.

In another embodiment, determining that the wireless device 12 qualifies for coverage extension includes determining that the wireless device 12 has fewer than a predetermined number of receiver antennas.

In another embodiment, determining that the wireless device 12 qualifies for coverage extension includes determining that the wireless device 12 has a battery power lower than a predetermined amount.

In another embodiment, determining that the wireless device 12 qualifies for coverage extension includes determining that the wireless device 12 is moving away from the network entity 14.

In another embodiment, determining that the wireless device 12 qualifies for coverage extension includes receiving, at the communication interface 26, an indication of the wireless device's capabilities when the wireless device 12 enters the network 10.

In another embodiment, the communication interface 26 receives the indication of the wireless device's capabilities during RRC connection set up.

In another embodiment, memory 30 further stores instructions that, when executed, configure the processor 28 to determine additional resources needed to meet an increased power budget due to increasing the downlink transmission power to the wireless device 12, and determine if the additional resources exceed a predetermined amount of headroom, wherein if the additional resources exceed the predetermined amount of headroom, processor 28 is further configured to create additional headroom to increase the downlink transmission power to the wireless device.

In another embodiment, the predetermined amount of headroom is equal to available resources for the wireless device 12. In another embodiment, memory 30 further stores instructions that, when executed, configure the processor 28 to create additional headroom by readjusting an initial resource assignment for the wireless device 12 such that the additional resource assignment required to meet the increased power budget are within the additional headroom. In another embodiment, the additional resources required to meet the increased power budget are set to zero-transmit-power resources. In another embodiment, available resources for scheduling a next wireless device 12 in a scheduling queue are determined by the available resources for the wireless device 12 minus the initial resource assignment minus the additional resources required to meet the increased power budget.

In another embodiment, available resources for scheduling the next wireless device 12 in a scheduling queue are determined by the available resources for the wireless device 12 minus the initial resource assignment. In another embodiment, the wireless device 12 is assigned resources in a transmission time interval (TTI) a maximum number of assigned resources being limited by a number of available radio resources from assignable radio resources, the assignable radio resources can be greater than or equal to the number of available radio resources.

In another embodiment, memory 30 of network entity 14 further stores instructions that, when executed, configure processor 28 to determine a TBS based on available radio resources, and wherein determining that wireless device 12 qualifies for coverage extension is based at least upon the determined TBS.

In another embodiment, memory 30 of network entity 14 further stores instructions that, when executed, configure processor 28 to determine a SINR for a current allocation of resources, compute a ratio of the SINR for the current allocation of resources to the SINR associated with the set of pre-established transmission criteria, and compute additional resources based at least upon the ratio of the SINR for the current allocation of resources to the SINR associated with the set of pre-established transmission criteria.

Figure 6:
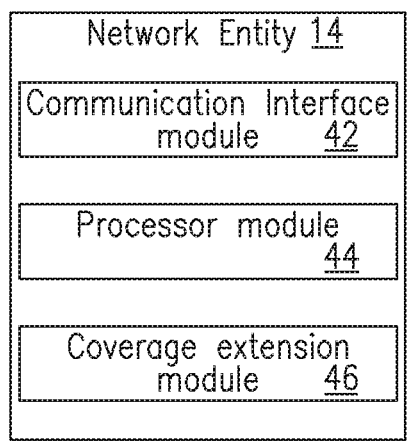
FIG. 6 illustrates a block diagram of an alternate network entity incorporating the principles of the present disclosure.

FIG. 6 illustrates an alternate embodiment of a network entity in accordance with the principles of the present disclosure. In one embodiment, a network entity 14 for extending communication coverage in a network 10 between the network entity 14 and a wireless device 12 is provided. The network entity 14 includes a communication interface module 42, a processor module 44 configured to determine that wireless device 12 qualifies for coverage extension, the determining including that deriving appropriate transmission parameters for the wireless devices results in one of a lowest possible or most robust modulation and coding scheme (MCS), and determine achievable transmission performance parameters for wireless device 12. If the determined achievable transmission performance parameters do not meet a set of pre-established transmission criteria, a coverage extension module is configured to increase the downlink transmission power to wireless device 12.

A network entity for extending communication coverage in a network between the network entity and a wireless device, the network entity comprising:

a communication interface module;

a processor module configured to:

determine that the wireless device qualifies for coverage extension, the determining including that deriving appropriate transmission parameters for the wireless devices results in one of a lowest possible or most robust modulation and coding scheme (MCS); and determine achievable transmission performance parameters for the wireless device; and if the determined achievable transmission performance parameters do not meet a set of pre-established transmission criteria, a coverage extension module configured to increase the downlink transmission power to the wireless device.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support embodiments directed to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings.

What is claimed is:

1. A method for extending communication coverage in a network between a network entity and a wireless device, the method comprising:
    determining that the wireless device qualifies for coverage extension, the determining including that deriving appropriate transmission parameters for the wireless device results in one of a lowest possible or most robust modulation and coding scheme (MCS);
    determining achievable transmission performance parameters for the wireless device;
    if the determined achievable transmission performance parameters do not meet a set of pre-established transmission criteria, increasing downlink transmission power to the wireless device;
    reevaluating the transmission parameters based on increasing the downlink transmission power to the wireless device;
    determining additional resources needed to meet an increase in total power budget due to increasing the downlink transmission power to the wireless device;
    determining if the additional resources exceed a predetermined amount of headroom; and
    in response to determining that the additional resources exceed the predetermined amount of headroom, creating additional headroom to increase the downlink transmission power to the wireless device.

2. The method of claim 1, further comprising determining a target signal-to-interference-plus-noise ratio, SINR, associated with the set of pre-established transmission criteria and increasing the downlink transmission power to the wireless device to assure meeting the determined target SINR.

3. The method of claim 1, wherein the transmission criteria include at least one of a target block error rate, BLER, target throughput, and target packet delay.

4. The method of claim 1, wherein determining that the wireless device qualifies for coverage extension includes determining that the wireless device has fewer than a predetermined number of receiver antennas.

5. The method of claim 1, wherein determining that the wireless device qualifies for coverage extension includes determining that the wireless device has a battery power lower than a predetermined amount.

6. The method of claim 1, wherein determining that the wireless device qualifies for coverage extension includes determining that the wireless device is moving away from the network entity.

7. The method of claim 1, wherein determining that the wireless device qualifies for coverage extension includes receiving an indication of capabilities of the wireless device when the wireless device enters the network.

8. The method of claim 7, wherein the network entity receives the indication of the capabilities of the wireless device during radio resource control, RRC, connection set up.

9. The method of claim 1, wherein the predetermined amount of headroom is equal to available resources for the wireless device.

10. The method of claim 1, further comprising creating additional headroom by readjusting an initial resource assignment for the wireless device such that an additional resource assignment required to meet the increase in the total power budget is within the additional headroom.

11. The method of claim 9, wherein the additional resources required to meet the increase in the power budget are set to zero-transmit-power resources.

12. The method of claim 10, wherein available resources for scheduling a next wireless device in a scheduling queue are determined by the available resources for the wireless device minus the initial resource assignment minus the additional resources required to meet the increase in the total power budget.

13. The method of claim 10, wherein available resources for scheduling a next wireless device in a scheduling queue are determined by the available resources for the wireless device minus the initial resource assignment.

14. The method of claim 1, wherein the wireless device is assigned resources in a transmission time interval, TTI, a maximum number of assigned resources being limited by a number of available radio resources from assignable radio resources, the assignable radio resources can be greater than or equal to the number of available radio resources.

15. The method of claim 14, further comprising:
determining a transport block size (TBS) based on available radio resources, and wherein
determining that the wireless device qualifies for coverage extension is based at least upon the determined TBS.

16. The method of claim 2, further comprising:
determining a SINR for a current allocation of resources;
computing a ratio of the SINR for the current allocation of resources to the SINR associated with the set of pre-established transmission criteria; and
computing additional resources based at least upon the ratio of the SINR for the current allocation of resources to the SINR associated with the set of pre-established transmission criteria.

17. A network entity for extending communication coverage in a network between the network entity and a wireless device, the network entity comprising:
a communication interface;
processing circuitry including a memory and a processor, the memory in communication with the processor, the memory having instructions that, when executed by the processor, configure the processor to:
determine that the wireless device qualifies for coverage extension, the determining including that deriving appropriate transmission parameters for the wireless device results in one of a lowest possible or most robust modulation and coding scheme (MCS);
determine achievable transmission performance parameters for the wireless device;
if the determined achievable transmission performance parameters do not meet a set of pre-established transmission criteria, increase downlink transmission power to the wireless device;
reevaluating the transmission parameters based on the increasing of the downlink transmission power to the wireless device;
determine additional resources needed to meet an increase in a total power budget due to increasing the downlink transmission power to the wireless device;
determine if the additional resources exceed a predetermined amount of headroom; and
in response to determining that the additional resources exceed the predetermined amount of headroom, create additional headroom to increase the downlink transmission power to the wireless device.

18. The network entity of claim 17, wherein the memory further stores instructions that, when executed, configure the processor to determine a target signal-to-interference-plus-noise ratio, SINR, associated with the set of pre-established transmission criteria and increase the downlink transmission power to the wireless device to assure meeting the determined target SINR.

19. The network entity of claim 17, wherein the transmission criteria include at least one of a target block error rate, BLER, target throughput, and target packet delay.

20. The network entity of claim 17, wherein determining that the wireless device qualifies for coverage extension includes determining that the wireless device has fewer than a predetermined number of receiver antennas.

21. The network entity of claim 17, wherein determining that the wireless device qualifies for coverage extension includes determining that the wireless device has a battery power lower than a predetermined amount.

22. The network entity of claim 17, wherein determining that the wireless device qualifies for coverage extension includes determining that the wireless device is moving away from the network entity.

23. The network entity of claim 17, wherein determining that the wireless device qualifies for coverage extension includes receiving, at the communication interface, an indication of capabilities of the wireless device when the wireless device enters the network.

24. The network entity of claim 23, wherein the communication interface receives the indication of the capabilities of the wireless device during radio resource control, RRC, connection set up.

25. The network entity of claim 17, wherein the predetermined amount of headroom is equal to available resources for the wireless device.

26. The network entity of claim 17, wherein the memory further stores instructions that, when executed, configure the processor to:
create additional headroom by readjusting an initial resource assignment for the wireless device such that an additional resource assignment required to meet the increase in the total power budget is within the additional headroom.

27. The network entity of claim 25, wherein the additional resources required to meet the increase in the total power budget are set to zero-transmit-power resources.

28. The network entity of claim 26, wherein available resources for scheduling a next wireless device in a scheduling queue are determined by the available resources for the wireless device minus the initial resource assignment minus the additional resources required to meet the increase in the total power budget.

29. The network entity of claim 26, available resources for scheduling a next wireless device in a scheduling queue are determined by the available resources for the wireless device minus the initial resource assignment.

30. The network entity of claim 17, wherein the wireless device is assigned resources in a transmission time interval, TTI, a maximum number of assigned resources being limited by a number of available radio resources from assignable radio resources, the assignable radio resources can be greater than or equal to the number of available radio resources.

31. The network entity of claim 17, wherein the memory further stores instructions that, when executed, configure the processor to:
determine a transport block size (TBS) based on available radio resources, and wherein determining that the wireless device qualifies for coverage extension is based at least upon the determined TBS.

32. The network entity of claim 17, wherein the memory further stores instructions that, when executed, configure the processor to:
determine a SINR for a current allocation of resources;
compute a ratio of the SINR for the current allocation of resources to the SINR associated with the set of pre-established transmission criteria; and
compute additional resources based at least upon the ratio of the SINR for the current allocation of resources to the SINR associated with the set of pre-established transmission criteria.

* * * * *